United States Patent
Oblack et al.

(10) Patent No.: US 9,789,418 B2
(45) Date of Patent: Oct. 17, 2017

(54) AMUSEMENT TOY

(71) Applicant: Doskocil Manufacturing Company, Inc., Arlington, TX (US)

(72) Inventors: Mark J. Oblack, Issaquah, WA (US); Mark Thinnes, Seattle, WA (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 13 days.

(21) Appl. No.: 13/963,584

(22) Filed: Aug. 9, 2013

(65) Prior Publication Data

US 2014/0065919 A1    Mar. 6, 2014

Related U.S. Application Data

(60) Provisional application No. 61/681,262, filed on Aug. 9, 2012, provisional application No. 61/682,695, filed on Aug. 13, 2012.

(51) Int. Cl.
| | | |
|---|---|---|
| A63H 27/00 | (2006.01) | |
| A63H 33/18 | (2006.01) | |
| A01K 15/02 | (2006.01) | |
| A63H 23/10 | (2006.01) | |

(52) U.S. Cl.
CPC ........... *A63H 33/18* (2013.01); *A01K 15/025* (2013.01); *A63H 23/10* (2013.01); *Y10T 29/49826* (2015.01); *Y10T 156/10* (2015.01)

(58) Field of Classification Search
CPC ...... A63H 23/10; A63H 33/18; Y10T 156/10; Y10T 29/49826; A01K 15/025
USPC ..................................................... 446/46, 47
See application file for complete search history.

(56) References Cited

U.S. PATENT DOCUMENTS

| | | | | |
|---|---|---|---|---|
| 1,804,563 A | * | 5/1931 | Kline | A45D 40/221 132/301 |
| 1,893,139 A | * | 1/1933 | Gessler | A47G 19/24 222/173 |
| 1,974,862 A | * | 9/1934 | Cryan | B65H 75/16 242/146 |
| 2,640,699 A | * | 6/1953 | Garbo | A63H 33/18 473/588 |
| 2,845,998 A | * | 8/1958 | Estabrook et al. | 297/452.23 |
| 3,120,319 A | * | 2/1964 | Buddrus | B65D 23/0885 206/523 |
| 3,335,846 A | * | 8/1967 | Mills | B65D 11/02 206/550 |
| 3,828,466 A | * | 8/1974 | Geiger | A63H 33/18 446/48 |
| 4,115,946 A | * | 9/1978 | Vukmirovich | 446/27 |
| 4,132,029 A | * | 1/1979 | Thompson et al. | 446/48 |
| 4,132,031 A | * | 1/1979 | Psyras | 446/47 |
| 4,196,540 A | * | 4/1980 | Hembree | A63H 33/18 446/46 |
| 4,204,357 A | * | 5/1980 | Harrington | 446/47 |

(Continued)

OTHER PUBLICATIONS

WO9614121A1 Inventor Sneddon Thomas MCA.*
Water Puck; http://www.chewber.com/CHEWBE-Toys.html.

*Primary Examiner* — Vishu Mendiratta
(74) *Attorney, Agent, or Firm* — Global IP Counselors, LLP

(57) ABSTRACT

A disk-like toy includes a resilient base, a flexible cover overlying the base, and a deflectable core disposed generally between the base and the cover. The base is affixed to at least one of the cover and the core.

12 Claims, 6 Drawing Sheets

(56) References Cited

U.S. PATENT DOCUMENTS

| | | | |
|---|---|---|---|
| 4,216,611 A * | 8/1980 | Psyras | 446/46 |
| 4,225,993 A * | 10/1980 | Hay | B63C 9/02 |
| | | | 114/349 |
| 4,253,672 A * | 3/1981 | Milzoff et al. | 473/588 |
| 4,503,635 A * | 3/1985 | Harrington | A63H 33/18 |
| | | | 446/46 |
| 4,979,922 A * | 12/1990 | Clark | 446/46 |
| 5,035,425 A | 7/1991 | Edwards | |
| 5,240,257 A * | 8/1993 | Sassak | 273/348.2 |
| 5,261,846 A * | 11/1993 | Hanna | 446/46 |
| 5,320,361 A * | 6/1994 | Hellerman | 473/588 |
| 5,358,440 A * | 10/1994 | Zheng | 446/48 |
| 5,362,066 A * | 11/1994 | Sassak | 273/348.2 |
| 5,476,405 A * | 12/1995 | Clayborne | 446/236 |
| 5,484,159 A | 1/1996 | Dean et al. | |
| 5,492,320 A * | 2/1996 | Hoffman et al. | 473/594 |
| 5,540,610 A * | 7/1996 | Sneddon | A63H 33/18 |
| | | | 446/236 |
| 5,882,239 A * | 3/1999 | Trichak | A63H 33/18 |
| | | | 446/219 |
| 5,904,118 A | 5/1999 | Markham | |
| 5,961,492 A * | 10/1999 | Kriesel | A61M 5/14248 |
| | | | 128/DIG. 12 |
| 6,174,214 B1 * | 1/2001 | Cooper | 446/46 |
| 6,247,584 B1 * | 6/2001 | Au | A45C 11/10 |
| | | | 190/124 |
| 6,247,989 B1 | 6/2001 | Neff | |
| 6,415,740 B1 | 7/2002 | Curry | |
| 6,604,742 B2 * | 8/2003 | El Sabbagh | 273/348.4 |
| 6,615,766 B1 | 9/2003 | Curry | |
| 6,918,355 B1 | 7/2005 | Arvanites | |
| 7,096,826 B2 | 8/2006 | Markham | |
| 8,474,410 B2 | 7/2013 | Oblack et al. | |
| 2003/0157862 A1 | 8/2003 | Dunn | |
| 2004/0089245 A1 | 5/2004 | Markham | |
| 2006/0102098 A1 | 5/2006 | Zelinger | |
| 2006/0201446 A1 | 9/2006 | Edwards | |

\* cited by examiner

AMUSEMENT TOY

CROSS-REFERENCE TO RELATED APPLICATION

This application claims priority from and claims the benefit of U.S. Provisional Patent Application Ser. No. 61/681,262, filed Aug. 9, 2012, and also U.S. Provisional Patent Application Ser. No. 61/682,695, filed Aug. 13, 2012.

BACKGROUND

Field

The present invention relates to amusement toys, and more particularly to amusement toys used for play with an animal.

Related Art

Amusement toys for animals are well known. However, known amusement toys often break down due to wear and tear from an animal. Those that are more durable are often not comfortable for animals to bite into. Additionally, amusement toys that are adapted for play with an animal on land are often not adapted for play with an animal in water.

There is room for improvement in amusement toys.

SUMMARY

In accordance with one aspect of the disclosed concept, a disk-like toy can be generally stated as including a resilient base, a flexible cover overlying the base, and a deflectable core disposed generally between the base and the cover. The base is affixed to at least one of the cover and the core.

As another aspect of the disclosed concept, a method of forming a disk-like toy is provided. The disk-like toy can be generally stated as including a resilient base having a peripheral edge, a flexible cover overlying the base and having a peripheral edge, and a deflectable core disposed generally between the base and the cover. The method includes the steps of: providing the core, affixing the core to the cover, affixing the core to the base, and affixing the peripheral edge of the base to the peripheral edge of the cover.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
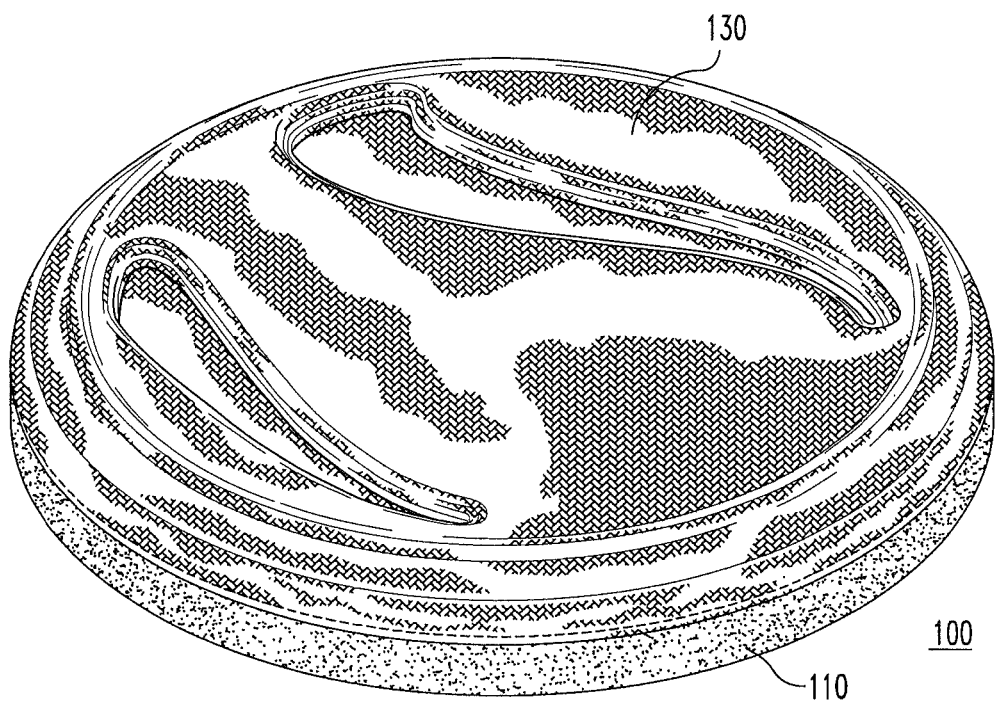
FIG. 1 is a perspective view of an amusement toy in accordance with an exemplary embodiment of the disclosed concept.
Figure 2:
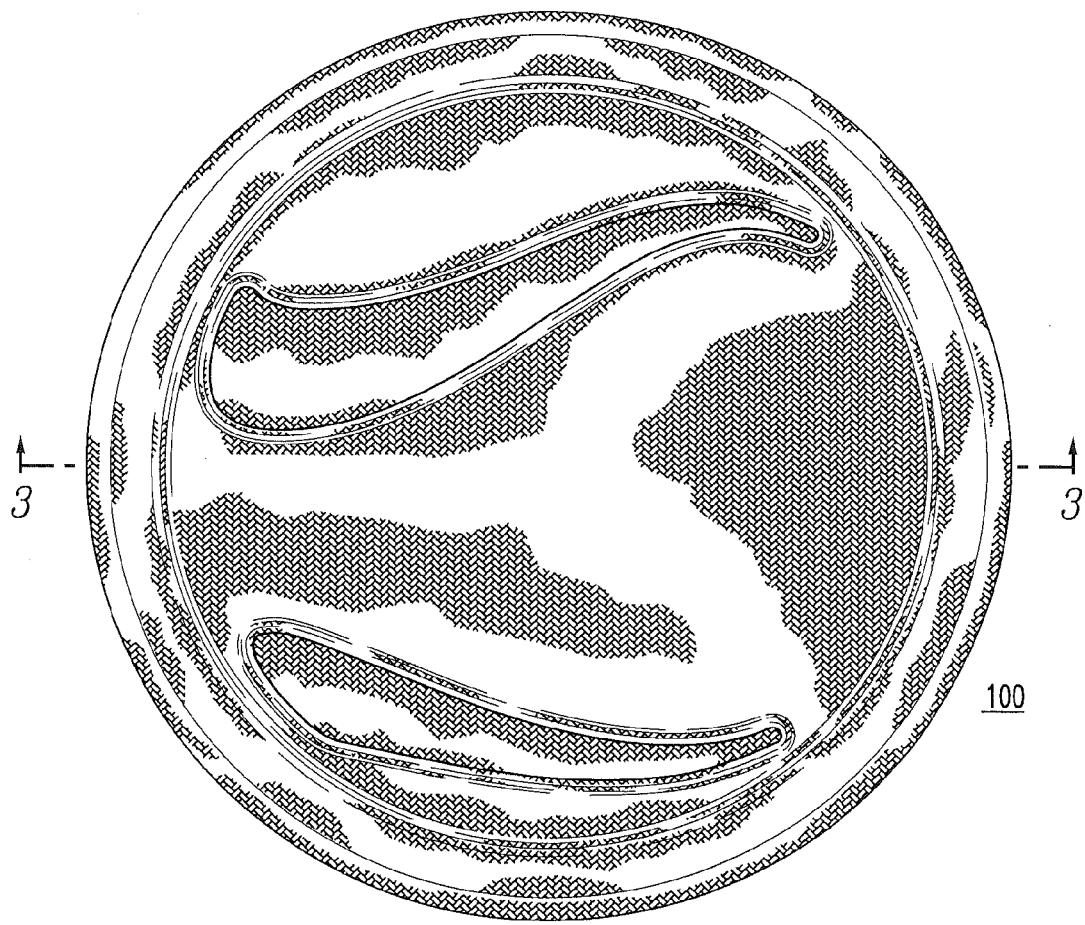
FIG. 2 is a top view of the amusement toy of FIG. 1.
Figure 3:
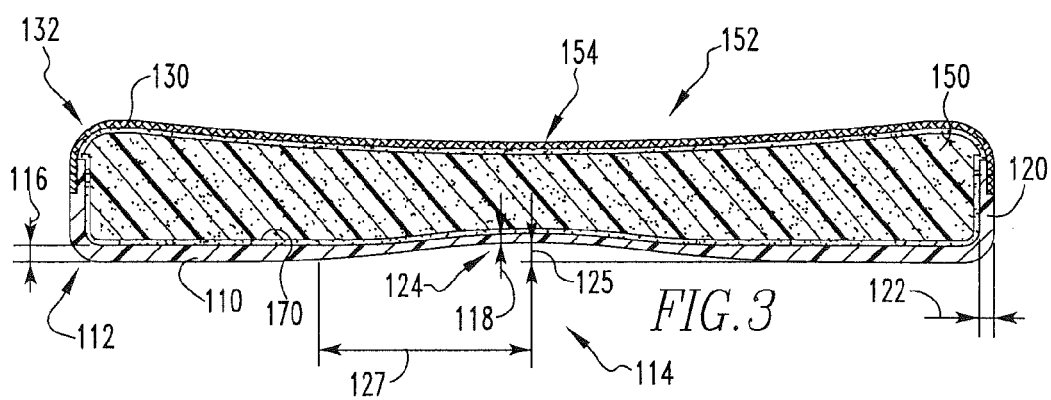
FIG. 3 is a section view taken along line 3-3 of FIG. 2.

As will be discussed below in connection with FIGS. 1 through 4, an amusement toy 100 allows for enhanced play with an animal on land as well as in water. FIG. 1 shows a disk-like amusement toy 100 that is structured to be thrown or rolled by an individual and retrieved by an animal. Seen in FIG. 1, the toy 100 has a resilient base 110 coupled to a durable and flexible cover 130 that overlies the base 110. Referring to FIG. 3, located between the base 110 and cover 130 is a core 150. The core 150 is deflectable and may be made from any material suitable for deflection such as, for example without limitation, an open or closed cell foam, a soft polymeric material, cork, or a flexible bladder. The toy 100 further includes an adhesive 170 that is structured to affix the base 110 and cover 130 directly to the core 150.

The base 110, which has a higher density than the cover 130 and the core 150, is constructed of a composition containing a monomer, polymer, or mixture thereof, preferably being constructed of an elastomeric material. The cover 130 is constructed of a textile, preferably a woven or nonwoven knit fabric, and more preferably polyester or nylon. Additionally, the durable cover 130 and resilient base 110, combined with the deflectable core 150, make the toy 100 soft for an animal to bite into, while being able to withstand wear and tear from repeated use.

Continuing to refer to FIG. 3, the base 110 has a peripheral edge 112 and a central region 114. As seen, the base 110 has a thickness 116 near the peripheral edge 112 that is greater than a thickness 118 located near the central region 114. Additionally, the base 110 has an upstanding peripheral rim 120 located near the peripheral edge 112. The peripheral rim 120 has a thickness 122 that is greater than the thickness 118 near the central region 114. The base 110 further has a recess 124 located near the central region 114. The cover 130 also has a central region 152 and a recess 154 located near the central region 152. The recesses 124,154 allow the toy 100 to have a greater proportion of weight distributed away from the central regions 144,152. The larger thicknesses 116,122 of the base 110 near the peripheral edge 112 likewise allow for the same result. Together, the weight distribution allows for greater stability as the toy 100 is thrown through the air or rolled on the ground, advantageously allowing the toy 100 to fly and roll farther.

Furthermore, the toy 100 is structured to skip on water when thrown over water. The recess 124 in the base 110 can allow the toy 100 to skip when thrown over water. Preferably, the recess 124 has a depth 125 that is between 0.05 inches and 0.5 inches, more preferably being between 0.1 inches and 0.3 inches. The recess 124 also has an outer radius 127 that is preferably between 0.5 inches and 4 inches, and more preferably being between 1 inch and 2 inches.

As seen in FIG. 3, the cover 130 has a peripheral edge 132. The peripheral edge 132 of the cover 130 is affixed to the peripheral rim 120 of the base 110. The affixing may be performed by stitching and the stitches may be protected from exposure to an animal by being sunk or recessed. Additionally or alternatively, the affixing may be with an adhesive, such as a thin polymer film that is heat activated. The affixing may additionally or alternatively be performed by welding, such as via ultrasonic, radio frequency, or laser welding.

Figure 4:
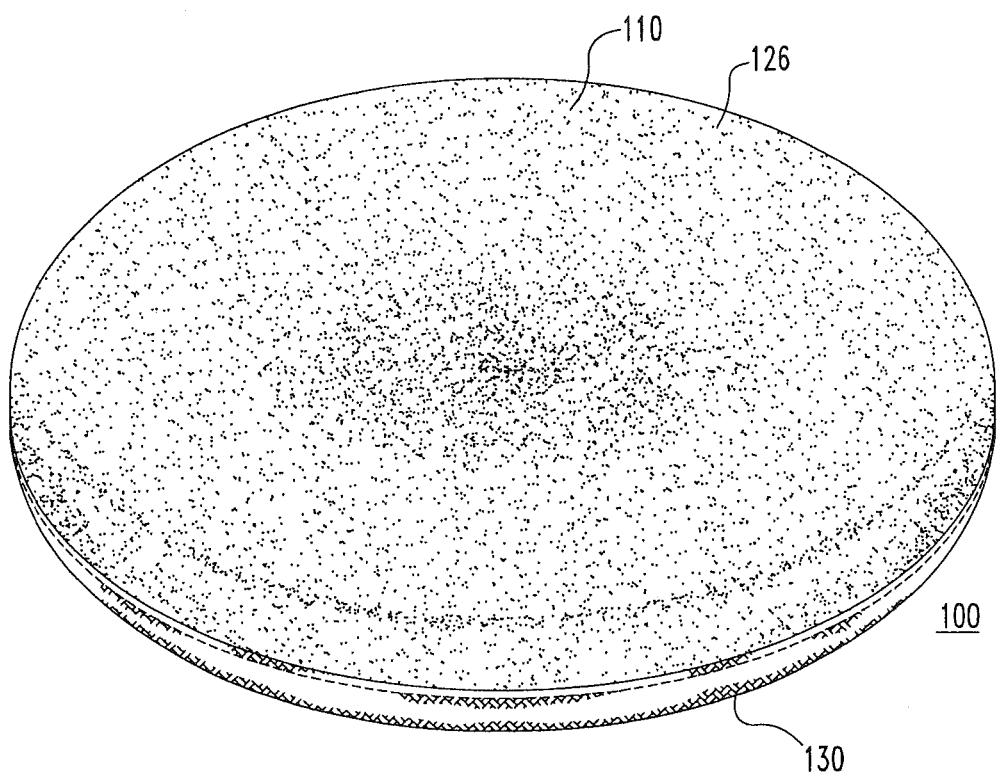
FIG. 4 is another perspective view of the amusement toy of FIG. 1.
Figure 5:
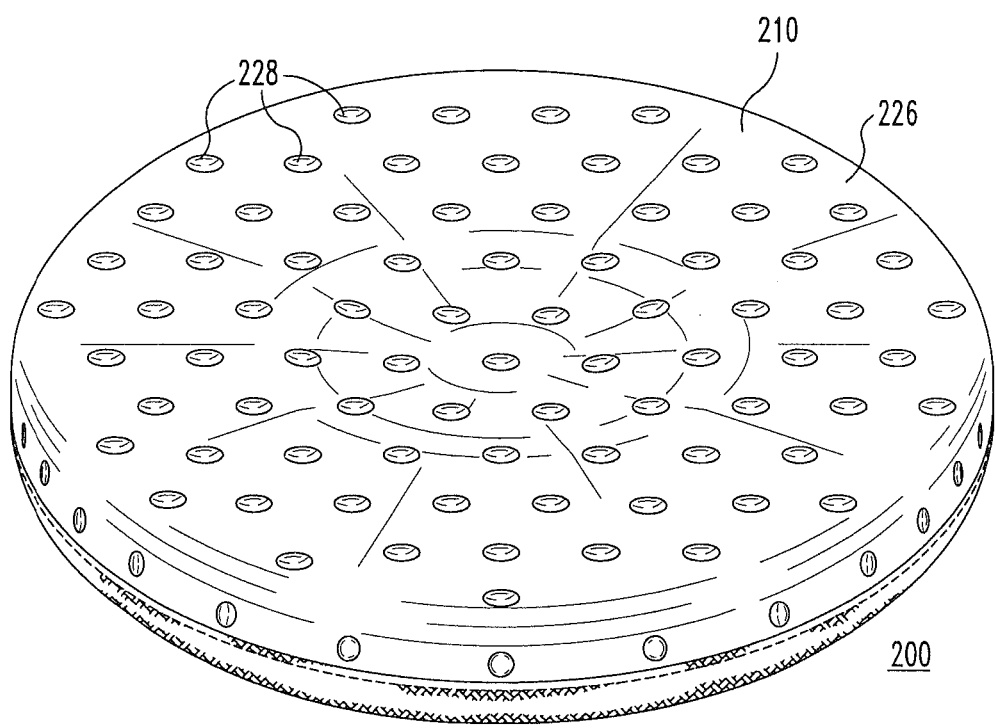
FIG. 5 is a perspective view of an amusement toy in accordance with an alternative embodiment of the disclosed concept.

Referring to FIG. 4, the base 110 of the toy 100 has an exterior surface 126 facing away from the core (see core 150 in FIG. 3). Schematically shown, the exterior surface 126 is roughened. FIG. 5 shows an alternative embodiment of the disclosed concept. As seen, a disk-like amusement toy 200 is substantially similar to the toy 100. The toy 200 has a base 210 that has an exterior surface 226 facing away from a core (not shown). Schematically shown, there are a number of dimples 228 on the exterior surface 226 that extend into the base 210. The roughened exterior surface 126 of the toy 100 and the dimples 228 of the amusement toy 200 advantageously make the exterior surfaces 126,226 easier to grip.

Additionally, when the toys 100,200 are thrown over water, the roughened exterior surface 126 of the toy 100 and the dimples 228 of the toy 200 can interfere with laminar flow of water at the interface between the toys 100,200 and the water as the toys 100,200 contact the water. This advantageously can further allow the toys 100,200 to skip on water. The disclosed concept is not limited to the exterior surfaces 126,226. It is within the scope of the disclosed concept to employ, for example and without limitation, bumps or texturing, located randomly or in arrays, to provide for improved gripping and skipping capabilities. The toys 100,200 are also structured to have a density less than one gram per cubic centimeter, preferably being between 0.1 and 0.4 grams per cubic centimeter. This density makes the toys 100,200 able to float high in water, which allows an animal to have less difficulty locating them once in the water.

Figure 6:
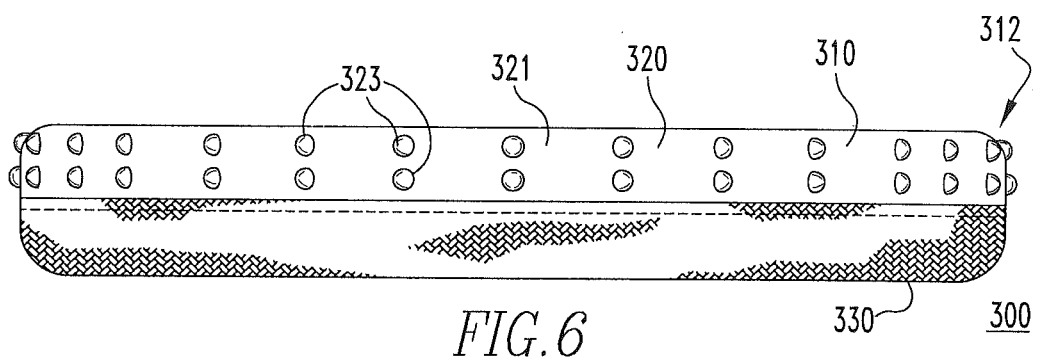
FIG. 6 is a side view of an amusement toy in accordance with a further embodiment of the disclosed concept.
Figure 7A:
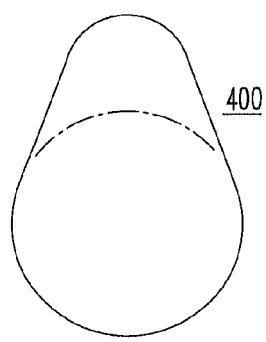
FIG. 7A is a top view of an amusement toy in accordance with an alternative embodiment of the disclosed concept.
Figure 7B:
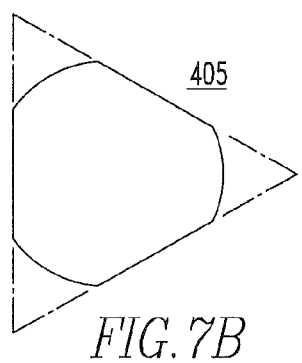
FIG. 7B is a top view of an amusement toy in accordance with an alternative embodiment of the disclosed concept.
Figure 7C:
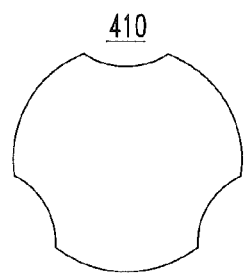
FIG. 7C is a top view of an amusement toy in accordance with an alternative embodiment of the disclosed concept.
Figure 7D:
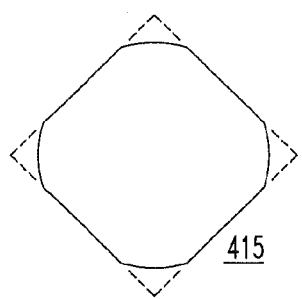
FIG. 7D is a top view of an amusement toy in accordance with an alternative embodiment of the disclosed concept.
Figure 7E:
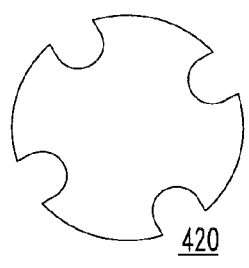
FIG. 7E is a top view of an amusement toy in accordance with an alternative embodiment of the disclosed concept.
Figure 7F:
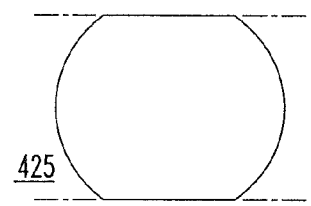
FIG. 7F is a top view of an amusement toy in accordance with an alternative embodiment of the disclosed concept.
Figure 7G:
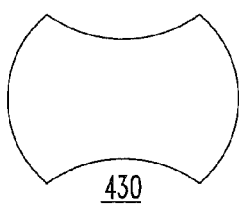
FIG. 7G is a top view of an amusement toy in accordance with an alternative embodiment of the disclosed concept.
Figure 7H:
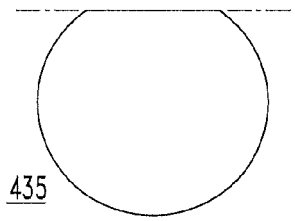
FIG. 7H is a top view of an amusement toy in accordance with an alternative embodiment of the disclosed concept.
Figure 7I:
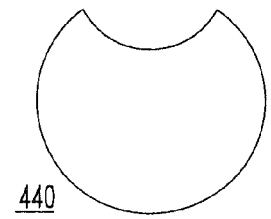
FIG. 7I is a top view of an amusement toy in accordance with an alternative embodiment of the disclosed concept.
Figure 7J:
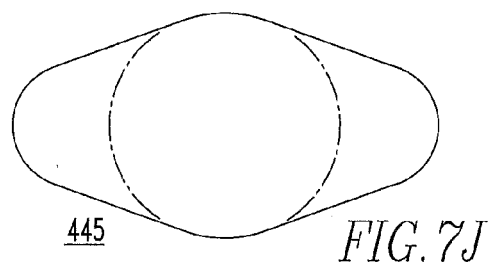
FIG. 7J is a top view of an amusement toy in accordance with an alternative embodiment of the disclosed concept.

FIG. 6 shows an alternative embodiment of the disclosed concept in which an amusement toy 300 is substantially similar to the toys 100,200. The toy 300 has a base 310 coupled to a cover 330, and a core (not shown) generally located between the base 310 and cover 330. Furthermore, the base 310 has an upstanding peripheral rim 320 located near a peripheral edge 312. The peripheral rim 320 has a peripheral surface 321 that faces away from the core (not shown). Schematically shown, there are a number of protrusions 323 on the peripheral surface 321. The protrusions 323 enhance the gripping capabilities of the toy 300. Additionally, it is within the scope of the disclosed concept to have treads on a peripheral surface (not shown) to enhance rolling capabilities.

The toys 100,200,300 seen in FIGS. 1 through 6 are disk-like and are generally circular shaped. However, the disclosed concept is not limited to circular shaped toys 100,200,300. FIGS. 7A through 7J show disk-shaped amusement toys 400,405,410,415,420,425,430,435,440,445 that are within the scope of the disclosed concept. The toys 400,405,410,415,420,425,430,435,440,445 have similar construction and materials as the toys 100,200,300, but the irregular shapes allow for additional capabilities, such as, for example and without limitation, irregular rolling.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A disk-like toy structured to be thrown by an individual, the disk-like toy comprising:
    a resilient base defining a peripheral edge of the toy, the base having a first recess located at a central region of the base, and an upstanding peripheral rim, the base further having a first thickness near the peripheral edge and a second thickness near the central region, the first thickness being greater than the second thickness;
    a flexible cover overlying the base, the flexible cover further having a second recess located at a central region of the cover that overlies that central region of the base such that the disk-like toy has a greater proportion of weight distributed away from the central regions; and
    a deflectable core disposed between the base and the cover, the base being affixed to at least one of the cover and the core, the upstanding peripheral rim of the base being disposed between the cover and the core.

2. The toy of claim 1 wherein
    at least the base is generally circular shaped.

3. The toy of claim 1 wherein
    the toy has a density of less than one gram per cubic centimeter.

4. The toy of claim 1 wherein
    the base is constructed of a composition containing a monomer, a polymer or a mixture thereof,
    the cover is constructed a textile; and
    the core is constructed of a foam material, the base having a higher density than each of the cover and the core.

5. The toy of claim 1 wherein
    the base has a first proportion of weight disposed proximate the central region and a second proportion of weight disposed proximate the peripheral edge, the second proportion of weight being greater than the first proportion of weight.

6. The toy of claim 1 wherein
    the base has an exterior surface facing away from the core, the exterior surface being roughened.

7. The toy of claim 1 wherein
    the base has an exterior surface facing away from the core, the exterior surface having a plurality of dimples.

8. The toy of claim 1 wherein
    the deflectable core is directly connected to a radial inner surface of the base.

9. The toy of claim 1 wherein
    the upstanding peripheral rim directly abuts an outermost radial edge of the core to separate the outermost radial edge of the core from a downward protrusion of the cover.

10. A disk-like toy structured to be thrown by an individual, the disk-like toy comprising:
    a resilient base defining a peripheral edge and having a first recess located at a central region of the base and an upstanding peripheral rim, the central region having a first thickness, the upstanding peripheral rim having a second thickness greater than the first thickness;

a flexible cover having a second recess located at a central region of the cover and overlying the base such that the disk-like toy has a greater proportion of weight distributed away from the central regions;

a deflectable core disposed between the base and the cover and being affixed to the base and the cover, the base being affixed to at least one of the cover and the core, the upstanding peripheral rim of the base being disposed between the cover and the core.

11. The toy of claim 10 wherein
the upstanding peripheral rim has a peripheral surface facing away from the core, the peripheral surface having a number of protrusions disposed thereon.

12. The toy of claim 10 wherein
the base further has a recess having a depth and an outer radius, wherein the depth is between 0.05 inches and 0.5 inches, and wherein the outer radius is between 0.5 inches and 4 inches.

\* \* \* \* \*